Figure 1:
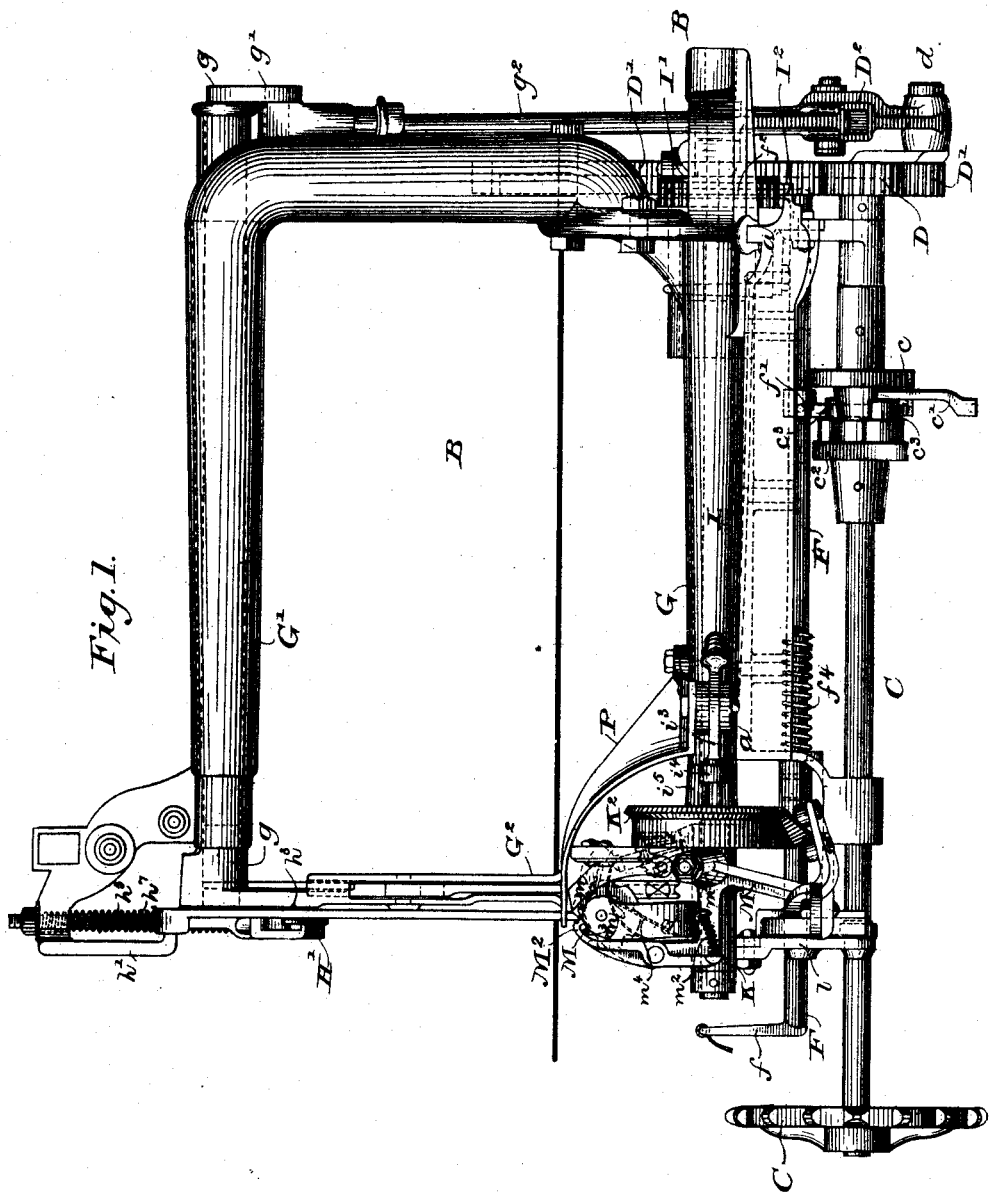

(No Model.) 7 Sheets—Sheet 1.
H. E. PRIDMORE.
GRAIN BINDER.

No. 422,444. Patented Mar. 4, 1890.

WITNESSES
Wm A. Skinkle.
Al. C. Newman.

INVENTOR
Henry E. Pridmore
By his Attorneys
Parkinson & Parkinson (No Model.)  7 Sheets—Sheet 3.

H. E. PRIDMORE.
GRAIN BINDER.

No. 422,444.  Patented Mar. 4, 1890.

WITNESSES
Wm A. Skinkle
Al. C. Newman.

INVENTOR
Henry E. Pridmore.
By his Attorneys
Parkinson & Parkinson (No Model.)  7 Sheets—Sheet 5.

H. E. PRIDMORE.
GRAIN BINDER.

No. 422,444.  Patented Mar. 4, 1890.

WITNESSES
Wm A. Skinkle
Al. C. Newman.

INVENTOR
Henry. E. Pridmore.
By his Attorneys (No Model.) 7 Sheets—Sheet 6.

H. E. PRIDMORE.
GRAIN BINDER.

No. 422,444. Patented Mar. 4, 1890.

WITNESSES
Wm A. Skinkle
Cel. C. Newman.

INVENTOR
Henry E. Pridmore.

By his Attorneys (No Model.)

H. E. PRIDMORE.
GRAIN BINDER.

No. 422,444.  Patented Mar. 4, 1890.

WITNESSES

INVENTOR
Henry E. Pridmore.
By his Attorneys

UNITED STATES PATENT OFFICE.

HENRY E. PRIDMORE, OF CHICAGO, ILLINOIS, ASSIGNOR TO THE McCORMICK HARVESTING MACHINE COMPANY.

GRAIN-BINDER.

SPECIFICATION forming part of Letters Patent No. 422,444, dated March 4, 1890.

Application filed March 16, 1885. Serial No. 159,078. (No model.)

*To all whom it may concern:*

Be it known that I, HENRY E. PRIDMORE, a citizen of the United States, residing at Chicago, in the county of Cook and State of Illinois, have invented certain new and useful Improvements in Grain-Binders, of which the following is a specification.

My invention relates in part to mechanism for imparting the to-and-fro-movements to the reciprocating carriage used in one of the well-known types of the McCormick binders and for vibrating the binder-arm upon its pivot at each end of the reciprocation, in part to the band-carrying and gavel-compressing devices, in part also to a novel manner of operating the knotter and to means whereby said knotter and the holder and cutter are actuated in the reciprocating of the carriage, and in part to certain details of construction, as will hereinafter appear. Formerly the binder-carriage in said type of machines was moved back and forth by means of a chain running lengthwise of the carrying-frame and connected with said carriage by a stirrup-link and with a crank from the binder-arm shaft by means of a pitman attached to said link, so that the binder-arm would be opened and closed as the link was carried around the sprocket-wheel at the outer and inner sides of the grain-receptacle, respectively. In place of the chain and link I substitute a pitman leading directly from a wrist-pin on a driven wheel at the inner side of the receptacle to a pivotal attachment with the carriage, so that said carriage will be carried positively back and forth by the action of this pitman and be held stationary when the pitman is passing its dead-center, which will be at the outer and inner ends of the reciprocation. The binder-arm is operated from this pitman by means of a link connecting a crank from its shaft with the body of the pitman intermediately of the two pivotal attachments of the latter.

To prevent grain from entering and being pressed or pinched between the converging shanks of the binder arm and compressor above the space intended for the gavel, I connect a bridge-piece or bar with said binder-arm in such manner that, whether the binder-arm is open or closed, it always extends across the gap between the shank of said arm and the shank of the compressor, and thus forms a third or upper side to the compressing-space and insures a clean gavel. Said bridge-bar is also made an instrumentality in actuating the compressor-arm.

In operating the knotter, which may be the usual tying-bill, I cause it to move up toward the gavel as it winds the cord about itself, thus forming the knot in close proximity to the grain and insuring a tight band, and after the knot is formed said knotter is moved sharply away from the gavel, still holding the ends of the cord in order to slip the loop off and tighten the knot.

The cord-holder is the ordinary disk; but to render its action accurate the pivot for the stock which carries the actuating-dog is afforded by an eccentric sleeve, which may be turned upon its axle and locked in any desired adjustment thereabout, changing the center of vibration of said stock, and consequently hastening or retarding the action of the dog.

When used in connection with the reciprocating carriage, the knotter and holder, which I intend to maintain their relative distances at all times, are swung upon a common pivot by a camway or track formed in one of the bars of the supporting-frame to carry the knotter toward and from the gavel, as already explained, and are actuated as to their other motions by a gear and cam wheel upon a shaft mounted in said carriage, subtending the grain-receptacle and rotated as the carriage reciprocates by a rack upon the frame.

Such other features and details of construction as constitute part of my invention will appear from the ensuing description.

Figure 2:
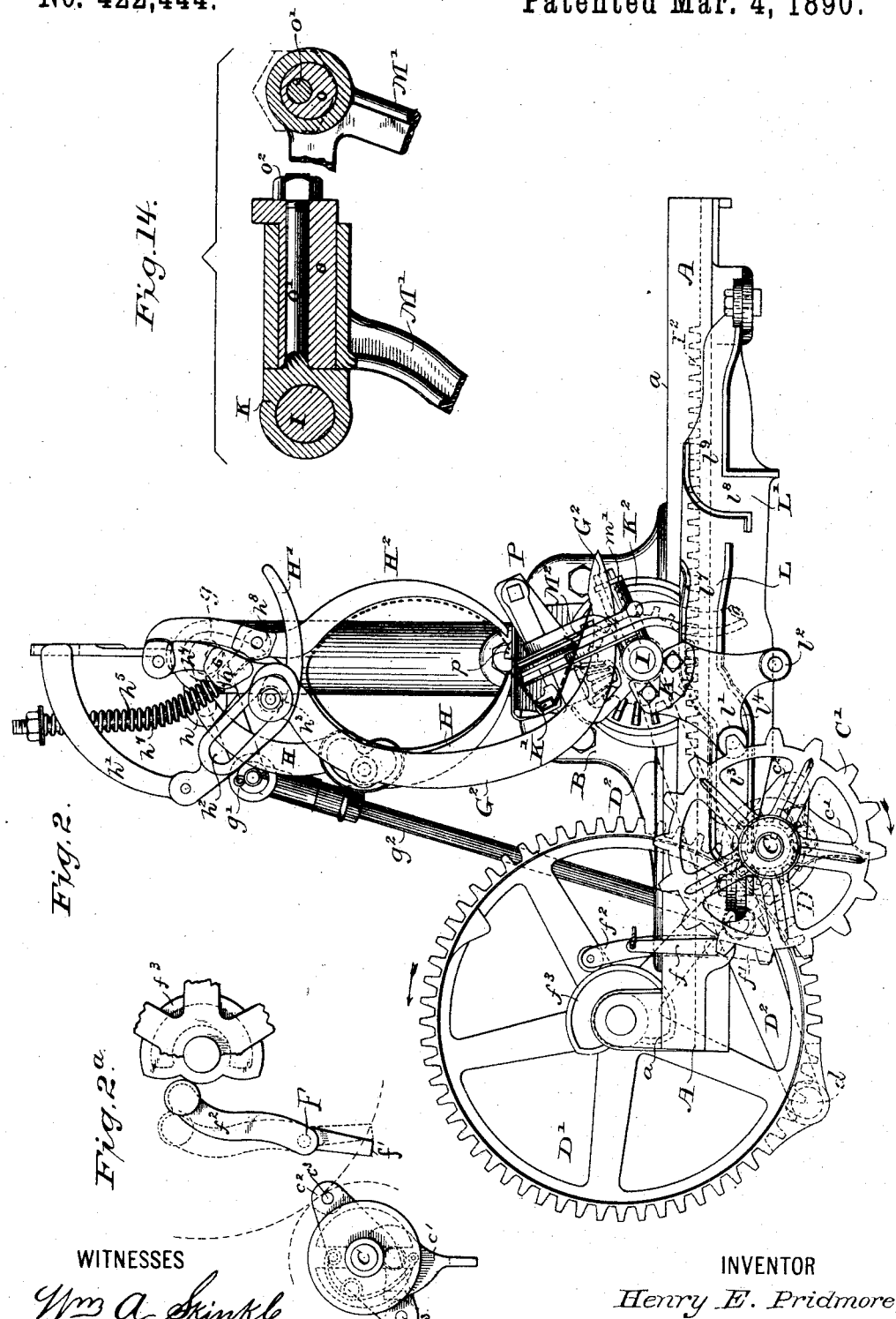
Figure 3:
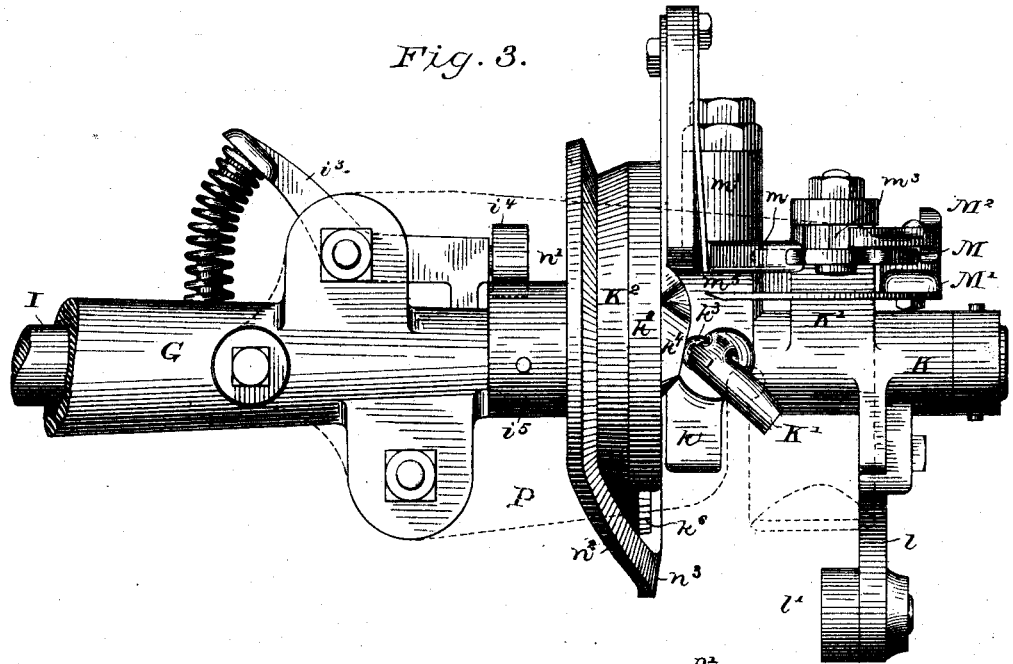
Figure 4:
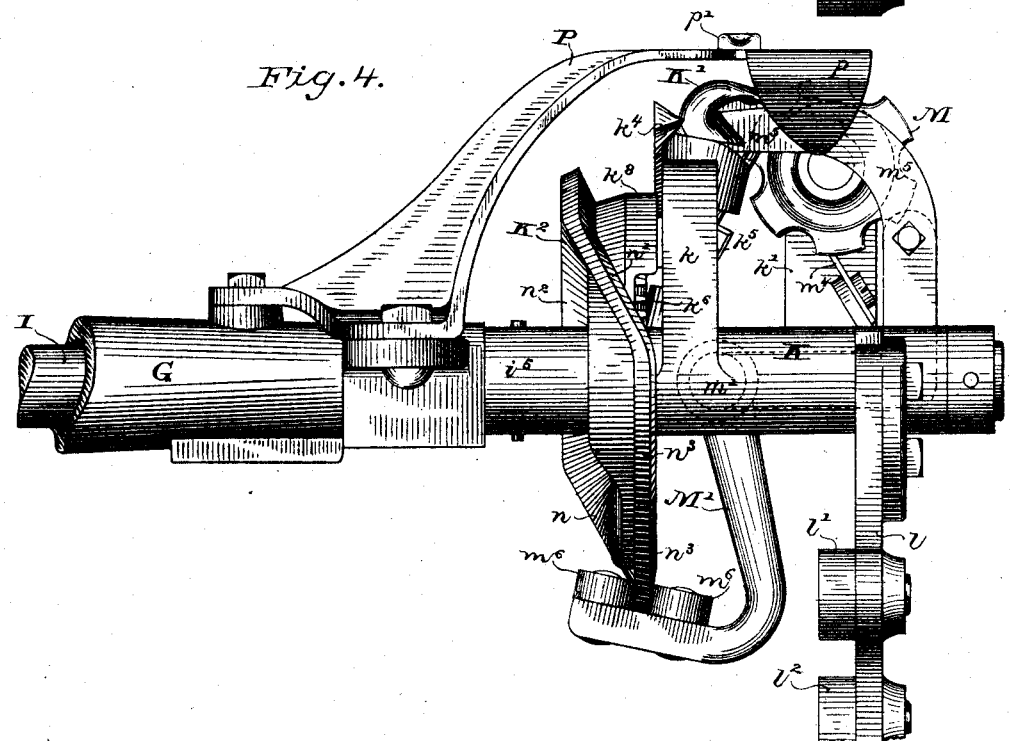
Figure 5:
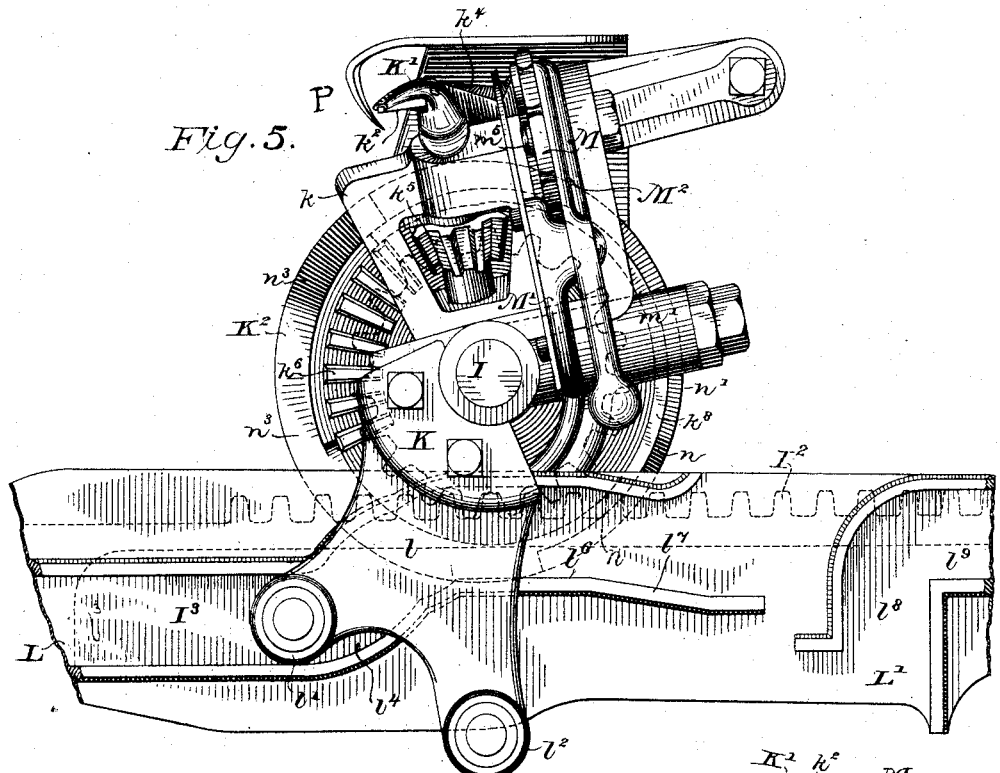
Figure 6:
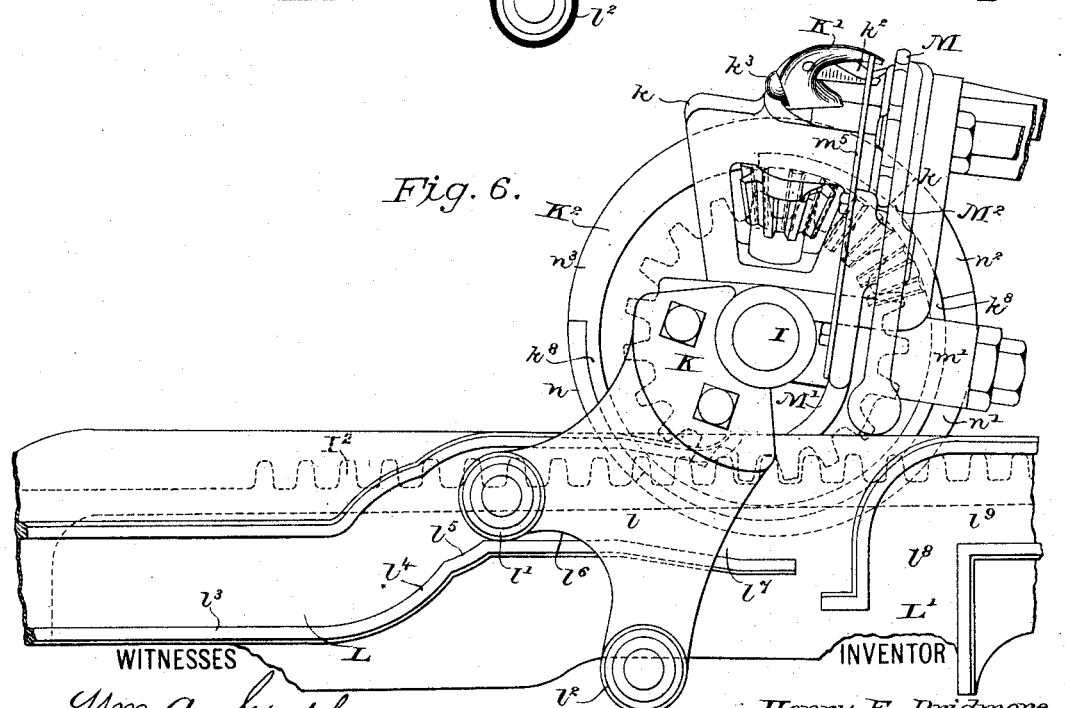
Figure 7:
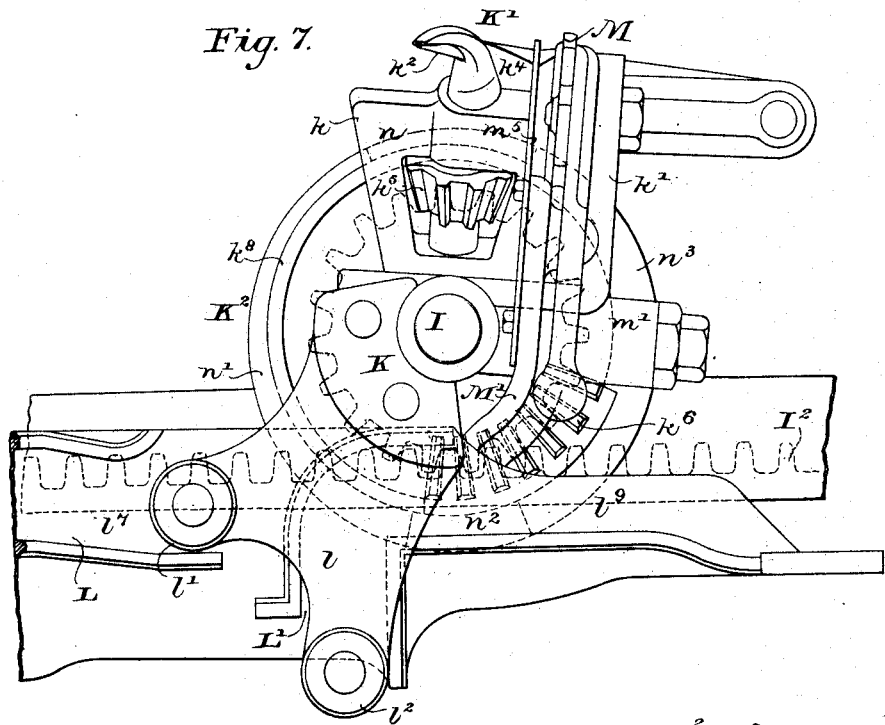
Figure 8:
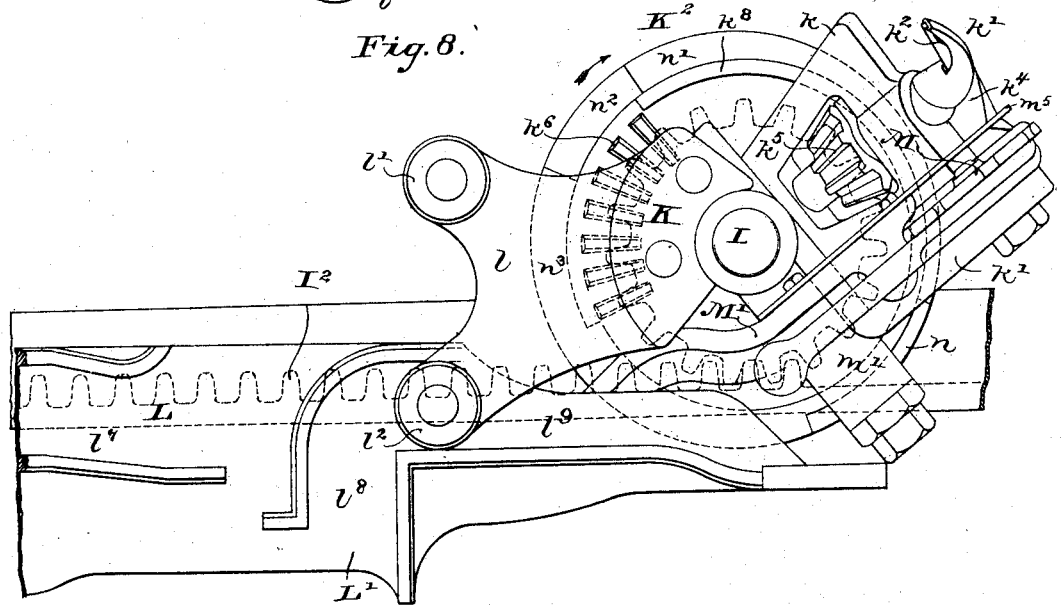
Figure 9:
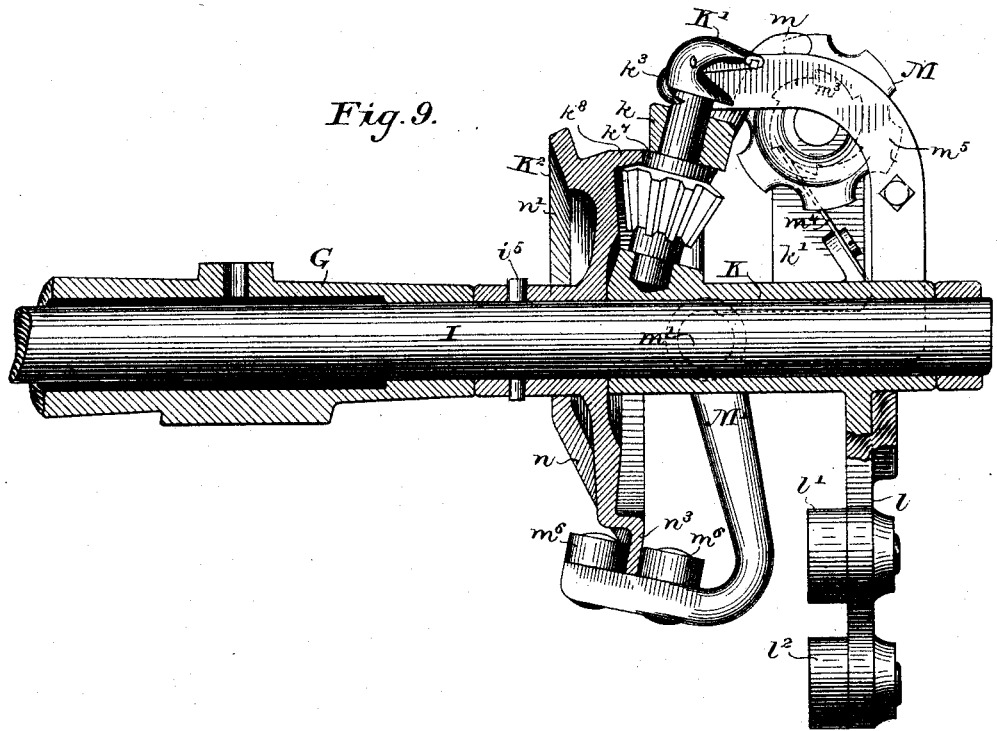
Figure 10:
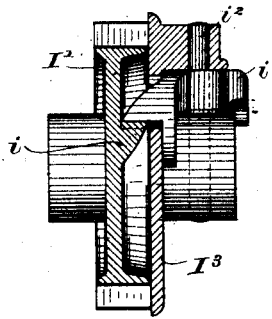
Figure 11:
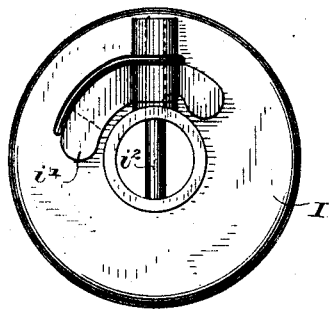
Figure 12:
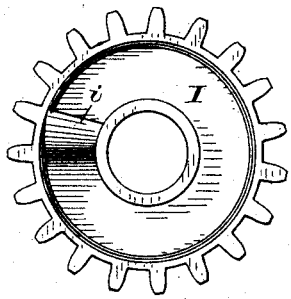
Figure 13:
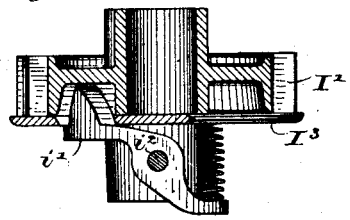
Figure 15:
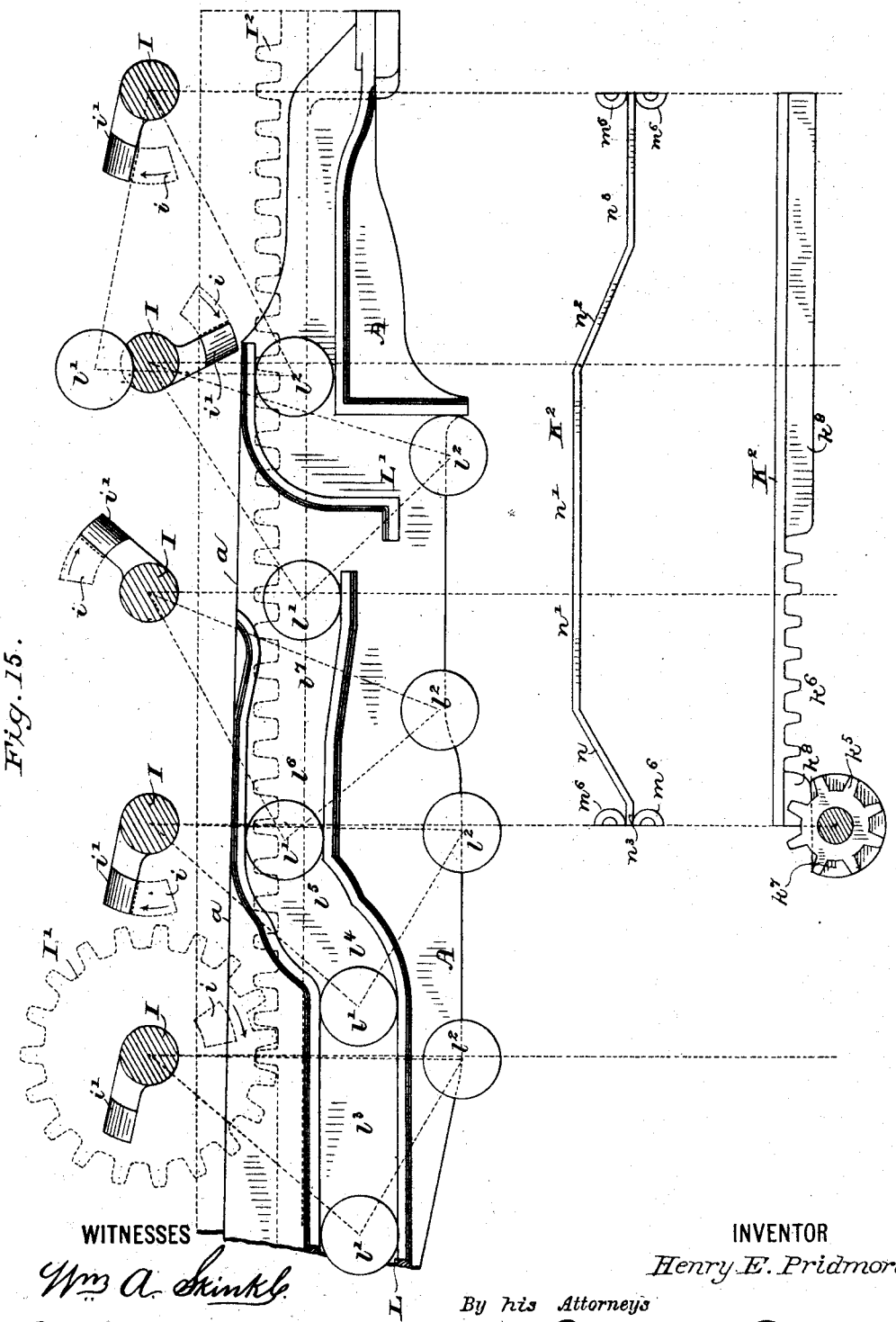

In the drawings, Figure 1 is an elevation from the stubble side of a binding attachment embodying my improvements. Fig. 2 is an elevation from the rear. Fig. 2ª is a detail view of the clutching device; Fig. 3, a top or plan view of the knotting, holding, and cutting mechanism and their immediate actuating devices, enlarged; Fig. 4, an elevation of the same from the inner or grain side; Figs. 5 to 8, like elevations from the rear of the machine, showing the camway or track for rocking said devices upon their common pivot.

with the knotter in successive stages of its action; Fig. 9, an elevation in section from the inner or grain side of said knotting, holding, and cutting devices and their immediate actuating mechanism. Figs. 10 to 13 show the clutch arrangement on the shaft for driving these devices; Fig. 14, a detail of the pivot of the bell-crank; and Fig. 15 is a diagram to illustrate the operation of this shaft and its clutch and the relative position of other parts at successive stages of its operation.

A is a supporting-frame having ways $a$, upon which the binder-carriage B reciprocates back and forth. In hangers beneath this frame is journaled a shaft C, constantly driven from the harvester-chain by means of a sprocket-wheel C' at its rear end, and constituting the driving-shaft of the binder. In line with this shaft is a second short shaft $C^2$, carrying a disk $c$, upon which is pivoted a spring-pressed driving-dog $c'$, and upon an opposing cross-head $c^2$ at the adjacent end of the just-mentioned driving-shaft are mounted driving-lugs or bayonets $c^3$, which engage with the dog when the latter is in its normal position, and therefore drive the short shaft. A pinion D on the front end of the latter meshes with and drives a gear-wheel D' at the inner front corner of the grain-receptacle, and a pitman $D^2$ connects a wrist-pin $d$ on said gear-wheel with the binder-carriage B, so that as the gear revolves reciprocating motion shall be communicated to said carriage.

Alongside and in proximity to the two shafts immediately above referred to a rock-shaft F is mounted in the frame, and a crank-arm $f$ from the rear end of this shaft will be suitably connected with a tripping-lever or other device for gaging the amount of grain to form a gavel, so that the shaft will be rocked by the accumulation of such grain. Opposite the driving-dog this shaft has an arm or latch $f'$, which at the proper time comes against the dog $c'$ and disengages it to throw the binding mechanism out of gear with the constantly-driven shaft. At the front end of the "trip-shaft" (as it will henceforth be called) is another crank-arm $f^2$, provided with an anti-friction roller at its end, which rests upon the periphery of a cam $f^3$, formed upon the gear-wheel D' at the inner front corner of the binding-receptacle, and is held thereupon and pressed thereagainst by means of a spring $f^4$, coiled about the shaft. So long as the roller is traveling upon the concentric portion of the cam, which will be during the binding operation, the trip-latch $f'$ is held out of the way of the driving-dog; but when the roller meets the cut-away portion of the cam it is caused to sink therein by the force of the spring, and, the trip-shaft being rocked, the trip-latch is lifted into the path of the dog, which is immediately thereafter brought against it and disengaged, stopping the machine. The binding mechanism will thus be thrown out of action at the end of one complete revolution of the gear-wheel, and will not be again started until the trip-shaft is reversely rocked by the action of the trip-lever, effected by the accumulated grain, to carry the trip-latch out of contact with the driving-dog, which will then spring into engagement and start the machine.

The binding-carriage is formed, as usual, with an arm G, subtending the receptacle and constituting the carriage proper, and a post-frame rising therefrom and having an overhung arm G', in which is journaled a shaft $g$, bearing the binder-arm $G^2$ at its rear end and having a crank $g'$ at its front end. This crank is connected by a link $g^2$ with the pitman between the gear-wheel and the carriage, the connection being made at about one-third of the length of the pitman from its wrist-pin joint with the gear-wheel. Thus, as the gear-wheel revolves, it carries the binding-carriage to and fro by the pitman-connection, and as this pitman is raised and lowered by the revolution of the wheel it raises and lowers the binder-arm through the medium of the link. A single revolution of the gear-wheel will therefore carry the binding-carriage to the inner side of the grain-receptacle and cause the binding-arm to descend, and then thrust the carriage to the outer side of the receptacle and open the binder-arm for the discharge of the bound sheaf, at which moment the cut-away portion of the cam on said wheel will have been reached by the roller on the trip-shaft and the binding mechanism will be unclutched and come to rest in readiness for the accummulation of the next gavel.

The usual tucker H is pivoted to a bracket $h$ from the overhung arm of the post-frame and actuated by connection with the binder-arm, as heretofore. To another bracket $h'$ is pivoted a curved bar H', having a longitudinal slot $h^2$ in its shank, into which slot takes a pin or roller $h^3$ from the shank of the binder-arm, and of such outline that the free end projecting beyond the binder-arm toward the stubble side trends at all times parallel with the grain-receptacle or binding-table as if abreast thereabove. From this bar and rigid therewith rises a standard $h^4$, to the upper end of which the compressor $H^2$ is hinged. A curved rod $h^5$, pivoted to the shank of the compressor, passes through a guide-eye $h^6$ in the standard and on the other side receives a coiled spring $h^7$, the stress of which is made adjustable by a nut, whereby the compressor is normally held against the standard and its action rendered elastic. When the binder-arm is down, the roller thereon will be at the outer end of the slot in the bar and the parts will have substantially the position represented in the second figure of the drawings, with the free end of the bar or the portion beyond the slot bridging the gap between the shanks of the binder-arm and compressor and resting on the top of the gavel. When the binder-arm rises, the roller traveling in the slot will lift the bridge-bar until its standard inclines inward and is nearly horizontal, thereby opening the compressor. Meanwhile the gap between the shanks of the binder-arm and compressor is constantly bridged by the bar, which is of sufficient length for the purpose. When the binder-arm descends it forces the bridge-bar down transversely to and upon the top of the gavel, and the compressor in this movement is permitted to close as the standard again approaches a perpendicular.

In the subtending arm of the binder-carriage is journaled a shaft I, which has at its front end a loose pinion I', meshing with a rack $I^2$ on one of the longitudinal bars of the supporting-frame. This pinion has a single lateral tooth $i$, beveled on the side corresponding to the retrograde or inward motion of the pinion, but perpendicular on the other. To the shaft is pinned a disk $I^3$, which comes against and closes the toothed side of the pinion and carries a spring-pressed clutch-dog $i'$, which tends constantly to assume a position insuring engagement with said tooth. The pivot of this dog is preferably the same pin $i^2$ which secures the disk to the shaft, and the nose of the dog is perpendicular on the side opposed to the face of the tooth and beveled on the other, so that the pinion may engage therewith only when driven in one direction, but in the reverse direction will push the dog aside as it passes it.

Near the rear end of the shaft and pivoted to a lug or bracket from one of its bearings or from the subtending arm of the carriage is a spring-pressed brake-dog $i^3$, carrying an anti-friction roller $i^4$ at its end, which in the revolution of the shaft travels upon the cylindrical periphery of a notched collar or hub $i^5$, pinned thereto, but at the end of the revolution falls into the notch with sufficient force to hold the shaft steady against anything but a positive impulse. The loose pinion in the present instance has but nineteen teeth, while the carriage moves over twenty-five teeth in the rack; but the shaft is intended to make but a single revolution in the binding operation, and this during the outward traverse of the carriage. The lateral driving-tooth on the pinion will therefore in the inward movement of the carriage be carried six teeth beyond the clutch-dog on the shaft, as indicated in the diagram, and in the outward traverse will make up this space of six teeth before it strikes the dog and starts the shaft. The positive motion then imparted to the shaft will cause the pinion on the brake-dog to ride up out of the notch and commence its journey on the cylindrical surface of the collar until the end of the revolution, when it will again fall into the notch and lock the shaft during the next inward traverse and until the driving-tooth on the pinion again engages with the clutch-dog.

Upon the rear end of the subtending shaft is sleeved a stock K, having lugs or offsets $k$ $k'$ for the support of the knotter and holder and their immediate actuating instrumentalities.

The knotter K', which I have chosen to illustrate my invention, and which I deem preferable for use in connection therewith, is the ordinary tying-bill, such as used in the McCormick twine-binder, having a pivoted jaw $k^2$, with a roller $k^3$ at its heel and operated by a spring-cam $k^4$ toward the end of its revolution to forcibly close upon the strands of cord stretched to the holder. To the spindle of this knotter, which is supported in the stock in a plane slightly inclined from the vertical, is keyed a bevel-pinion $k^5$, which engages with a segment-rack $k^6$ on the face of a gear and cam wheel $K^2$, pinned to the shaft I, and is given one revolution thereby to each revolution of the shaft. A delay-shoe $k^7$ is also affixed to the knotter-spindle to engage with a delay-ledge $k^8$ on the face of the gear and cam wheel and hold the knotter against rotary movement after it passes out of engagement with the rack.

Beneath on the opposite side of the shaft from the knotter the stock has a hanger $l$, carrying two anti-friction rollers $l'$ $l^2$, relatively arranged, as shown, which travel successively in camways or tracks L L', formed on the side of one of the supporting or longitudinal bars of the frame. When the carriage is at the inner end of its traverse and just starting out, the roller $l'$ is in the lower straight reach $l^3$ of its camway, and so long as it continues in that reach in the outward traverse the stock will be held stationary on its axis. At the end of this straight reach is a sharp upward deflection or swift incline $l^4$, which the roller strikes just as the knotter begins to revolve, and rises, swinging the knotter toward the gavel, giving slack in the cord during the first quarter or three-eighths of the revolution. During the next quarter of the revolution the roller travels in slower inclines $l^5$, giving less slack, and then along the short straight reach $l^6$ until the revolution is completed, no more slack being wanted. At the point it descends a slight incline $l'$ to swing the other roller into the mouth of its proper camway, which at first has a vertical reach $l^8$, causing said roller to travel up and swinging the knotter sharply and forcibly back away from the sheaf with its nose directed theretoward to tighten and pull away from the knot, and then a straight reach for the remainder of the outward traverse.

The holder is composed of the usual notched disk M, journaled upon the lug $k'$ from the swinging stock and embraced along one edge by a spring-pressed shoe $m$, whereby the cord is clamped as the disk rotates. A bell-crank M' is pivoted to the stock at $m'$ and upon one arm carries the independently-pivoted hooked pawl $M^2$, which by means of spring $m^2$ is constantly urged against the ratchet $m^3$ upon the under side of the holder-disk and caused to engage with its teeth and turn the disk whenever the lever is vibrated in the proper direction, but permitted to ride idly thereover in the reverse vibration. A click $m^4$ dogs the ratchet and disk against retrograde movement. Said arm of the bell-crank also supports the curved knife-blade $m^5$ in such position between the holder-disk and knotter that its cutting-edge may be brought against the cord stretched therebetween to sever it when the bell-crank is imparting the idle movement to the pawl after the knot has been laid and the holder-strands seized in the jaws of the knotter. The other arm of the bell-crank is bent to come beneath the periphery of the gear and cam wheel $K^2$, that drives the knotter and bears two anti-friction rollers $m^6$, which clip or embrace a cam-ledge thereon. This cam-ledge, reckoning from a point immediately before the knotter begins to revolve and swing, has first a deflection $n$, corresponding to the effective motion imparted to the pawl to cause the holder-disk to grasp the strand just brought down by the binder-arm, then a straight reach $n'$, holding the bell-crank fixed until the knot is laid and the holder-strands grasped between the jaws of the knotter, next a return deflection $n^2$, which moves the bell-crank to force the knife against said strands and sever them while the knotter and holder are swinging outward in the tightening movement and carry the pawl into position for a fresh grip on the ratchet, and, finally, a second straight reach $n^3$, connecting the foot of the last incline or deflection with the foot of the first and retaining the bell-crank in position to actuate the holder-disk to again grasp the strand brought down by the binder-arm in the next binding operation in advance of the rotation of the knotter. Both strands of the cord being thus grasped in the holder before and not severed until after the knotter acts, it will take slack in its swinging and winding movement from both alike without the slack of one being modified relatively to the other by the resistance of the spool or intermediate tension devices.

The holder-disk after having been subjected to considerable usage may and frequently does fail to act properly, owing to wear of its ratchet or of the pawl or other of its driving mechanism. To remedy this I make the pivot or fulcrum of the bell-crank shiftable by the employment of an eccentric sleeve $o$, borne upon a pintle $o'$, about which it may be set in any radial adjustment and may be clamped by a nut $o^2$ on the screw-threaded end of said pintle. The cylindrical periphery of this sleeve forms the actual pivot-bearing of the bell-crank, and its axis the axis of movement of the latter; but as this axis does not coincide with the axis of the pintle it is evident that the adjustment of the sleeve thereabout will transplace the fulcrum of the bell-crank relatively to the stock, thus hastening or retarding the action of the pawl upon the holder-disk.

The knotter and holding and cutting devices are covered and shielded by a hood P, slotted above the path of the knotter, as shown in dotted lines in Fig. 3, for the admission of the cord, and at the entrance to said slot, on the side away from the knotter-spindle, having a downbending arm $p$, which serves to properly guide the strand laid by the binder-arm in its descent. At the end of the slot is a low boss $p'$, serving as a stop to the cord-tucker. When the binder-arm rises at the conclusion of a binding operation, the knotter is in its position of rest, with its jaws pointing obliquely across the slot in the hood and closing it near its front end or mouth. The cord running through the eye of the binder-arm to the holder will therefore be laid under the chin of the knotter, then pass up through the outer part of the slot to the binder-arm, and ultimately to the source of supply. As the gavel accumulates, this strand will be bent over the crown of the knotter and pushed toward the rear of the slot, and presently the binder-arm coming down again will encircle the gavel and lay the second strand beneath the chin of the knotter by the side of the first and carry it to the holder, and the cord-tucker accompanying said arm and acting in the latter part of its movement will catch the second strand above the slot, push it on, bending it over the crown of the knotter, and finally bring it, together with the first, which it has overtaken, to the rear end of the slot and against or close to the boss. By this time the holder has caught the end of the band presented by the binder-arm, and there is now a distinct bight or bend formed in the strands between the holder and gavel, with the knotter at the apex thereof, since the strands both run inward from the holder to the knotter and under its chin, and then are returned outward over its crown to the boss, and there retained close to the gavel by the action of the tucker. The knotter now begins to revolve, swinging up toward the boss as it does so, and therefore toward the gavel, and letting out slack from the bend formed in the two strands, which it as promptly takes up in its winding movement. When the knotter is directly underneath the rear end of the slot in the hood or beneath the boss, it is nearest to the gavel and has finished laying the knot, has the holder-strands clamped in its jaws, and has ceased to revolve. At this moment its jaws trend obliquely in the direction of the slot—that is, in the same direction as before the revolution commenced—and now the further swinging movement takes place, carrying the knotter farther back within the hood and away from the gavel to strip and tighten the knot. In this movement the crown of the knotter is swept by the under surface of the hood behind the boss, and the loop thus more effectually stripped from the jaws. At the termination of this tightening swing the band ends have been severed and the bound sheaf is ready for discharge.

I claim—

1. The combination, substantially as hereinbefore set forth, of the driving-shaft, the short shaft placed end to end therewith, the disk and its lugs on the short shaft, the driving-dog on the driving-shaft, the rock-shaft and its trip-latch, and the cam upon which a crank-arm from said rock-shaft rests to hold the latch away from the dog during the binding operation.

2. The combination, substantially as hereinbefore set forth, of the gear-wheel at the inner side of the grain-receptacle, the reciprocating binding-carriage, the pitman connecting said carriage with a wrist-pin on the gear-wheel, the tripping-clutch in the train by which said wheel is driven, the trip-latch, and trip-shaft.

3. The combination, substantially as hereinbefore set forth, of the gear-wheel at the inner side of the grain-receptacle, the reciprocating binding-carriage, the pitman connecting said carriage with a wrist-pin on the gear-wheel, the short shaft having a pinion engaging with the gear-wheel, the constantly-driven shaft end to end with said short shaft, the lugs and driving-dog on said shafts, the trip-shaft with cranks and trip-latch, the spring acting on said trip-shaft, and the cam on the gear-wheel upon which a roller mounted in the end of the adjacent crank-arm rides to hold the latch away from the dog.

4. The combination, substantially as hereinbefore set forth, of the gear-wheel at the inner side of the grain-receptacle, the reciprocating binding-carriage, the pitman connecting said carriage with a wrist-pin on the gear-wheel, the binder-arm and its cranked shaft, and the link connecting the crank on said shaft with the pitman intermediate between its pivotal joints with the carriage and the wrist-pin.

5. The combination, substantially as hereinbefore set forth, of the binder-arm, the compressor, and a bridge-bar closing the space between the shanks of the two to prevent grain being caught therebetween.

6. The combination, substantially as hereinbefore set forth, of the binder-arm, the compressor, a bridge-bar closing the space between the shanks of the two, and a connection between said binder-arm and the bridge-bar, whereby the latter is operated by the former.

7. The combination, substantially as hereinbefore set forth, of the binder-arm, the compressor, and a bridge-bar closing the space between the shanks of the two and acting to open the compressor when the binder-arm opens.

8. The combination, substantially as hereinbefore set forth, of the binder-arm, the compressor, the pivoted overhead arm, and the pin or roller from the shank of the binder-arm playing in a longitudinal slot in said pivoted arm to cause it to descend upon the top of the gavel when the binder-arm and compressor close.

9. The combination, substantially as hereinbefore set forth, of the binder-arm, the compressor, the curved bridge-arm arranged to close the space between the shanks of the two, and the pin or roller from the binder-arm playing in a longitudinal slot in said bridge-arm and acting to retain it always in position across said space.

10. The combination, substantially as hereinbefore set forth, of the overhead compressing-arm, the standard therefrom, the outside compressor pivoted to the standard, the spring acting upon said compressor, and the stop upon the shank of the outside compressor, whereby the rise of the overhead compressor serves to open the outside compressor.

11. The combination, substantially as hereinbefore set forth, of the binder-arm, the pivoted bridge-bar, the pin or roller from the binder-arm M, playing in a longitudinal slot in the bridge-bar, the standard from the bridge-bar, the compressor pivoted to said standard, and the spring acting upon the compressor.

12. The combination, substantially as hereinbefore set forth, of the binder-arm, the compressor, the pivoted bridge-bar, the pin or roller playing in a longitudinal slot in the bridge-bar, the standard from said bar, the compressor pivoted to the standard, the curved rod hinged to the compressor and passing through an eye in the standard, and the spring coiled about said rod.

13. The combination, substantially as hereinbefore set forth, of a tying-bill, mechanism which carries it toward the gavel as it rotates in forming the knot, and mechanism which imparts to it movement, after it ceases to rotate, away from the gavel and with its jaws trending theretoward to strip and tighten the knot.

14. The combination, substantially as hereinbefore set forth, of a knotter, mechanism which moves the same toward the gavel as it forms the knot, and mechanism which produces a bend in the strands of cord leading from the holder past the knotter, and of which bend the knotter is the apex, whereby as the knotter moves toward the gavel slack is given up from said bend.

15. The combination, substantially as hereinbefore set forth, of a knotter, a pinion and delay-shoe on the shaft or spindle of said knotter, a wheel having a segment-rack and delay-ledge to engage with said pinion and shoe, and a stock in which the knotter is mounted pivoted to swing about the axis of said wheel.

16. The combination, substantially as hereinbefore set forth, of the knotter, the pivoted stock in which it is journaled, the hanger from said stock, the two pins or rollers which project from the hanger, and the two cam-tracks in which said rollers successively travel.

17. The combination, substantially as hereinbefore set forth, of the reciprocating binding-carriage, the shaft journaled in the subtending arm thereof, the wheel upon said shaft having a segment-rack and delay-ledge, the stock pivoted to the shaft alongside the wheel, the hanger from said stock with its two rollers, the two cam-tracks in the frame traversed in succession by said rollers, and the knotter mounted in the stock and having a pinion and delay-shoe engaging with said rack and ledge.

18. The combination, substantially as hereinbefore set forth, of the reciprocating binding-carriage, the knotter borne thereby, the pivoted stock in which said knotter is journaled, the pins or rollers on a hanger from said stock, a first or inner cam-track on the frame with which one of said rollers engages and having rises or deflections to swing the knotter toward the gavel, and a second or outer cam-track, with which the other roller engages as the first leaves its track, having an abrupt rise to continue the swinging movement of the knotter past and away from the gavel.

19. The combination, substantially as hereinbefore set forth, of a knotter, a pivoted supporting-stock therefor, means whereby the stock is swung upon its pivot to carry the knotter toward the gavel as it forms the knot and then past and away therefrom to strip and tighten the knot, and a cord-holder mounted upon said stock to accompany the knotter in its swinging movement and retain its relative distance therefrom.

20. The combination, substantially as hereinbefore set forth, of the notched holder-disk, its shoe, the ratchet on said disk, the bell-crank having an independently-pivoted pawl on its weight-arm engaging with said ratchet and two rollers on its bent power-arm, and a wheel having a peripheral cam-flange, which engages with said rollers to vibrate the lever and hold it stationary.

21. The combination, substantially as hereinbefore set forth, of the knotter, its pinion and delay-shoe, the holder, the bell-crank, the knife fixed to the weight-arm of said bell-crank and entering between the knotter and holder, the pins or rollers on the bent power-arm, and a wheel having a segment-rack and delay-ledge to operate the knotter, and a peripheral cam-flange, which engages with said rollers to operate the bell-crank and cutter.

22. The combination, substantially as hereinbefore set forth, of the knotter, its pinion and delay-shoe, the notched holder-disk, its clamping-shoe, the ratchet on said disk, the bell-crank, the pawl pivoted to the weight-arm of said bell-crank and engaging with the ratchet, the knife fixed to said weight-arm and entering between the knotter and the holder-disk, the pins or rollers on the bent power-arm, and the wheel having a segment-rack and delay-ledge to engage with the knotter, pinion, and shoe, and a peripheral cam-flange, which enters between the rollers on the bell-crank.

23. The combination, substantially as hereinbefore set forth, of the reciprocating binding-carriage, the shaft mounted in the subtending arm of said carriage, a wheel with face-rack and delay-ledge and peripheral cam-flange fixed to said shaft, the stock pivoted upon the shaft alongside said wheel, the knotter journaled in said stock and having a pinion and delay-shoe engaged by said rack and ledge, the notched holder-disk and its clamping-shoe mounted upon said stock, the bell-crank pivoted to the stock and carrying on one arm a pawl to move the disk and on the other pins or rollers which embrace the cam-flange, and cam ways or tracks upon the supporting-frame operating upon projections from the stock to swing said stock and the parts it supports about the shaft as the carriage reciprocates.

24. The combination, substantially as hereinbefore set forth, with the knotter and holder, of a cutter acting between the two, a pawl to move the holder-disk, and a lever actuating said holder and cutter and mounted upon a shiftable axis or fulcrum.

25. The combination, substantially as hereinbefore set forth, with the holder-disk and its actuating-lever, of the pivot-pin from the stock, the eccentric-sleeve thereon affording peripherally the actual bearing for the lever, and the clamping-nut on said pin, whereby the sleeve is secured in any desired adjustment.

26. The combination, substantially as hereinbefore set forth, of the swinging knotter, the cord-holder, the slotted hood, mechanism actuating said knotter and bringing it to rest for reception of the strands, with its jaws pointing across and barring the passage of said slot in advance of the rear end, and a cord-tucker which bends the upper strands over the crown of the knotter and forces them to the rear of the slot, whereby a bend is produced and slack afforded the knotter as it swings toward said rear end of the slot in the tying operation.

27. The combination, substantially as hereinbefore set forth, of the slotted hood, the knotter, mechanism which moves the same toward the rear of the slot in the tying operation, and mechanism whereby it is then given a further movement past the end of the slot to strip and tighten the knot.

28. The combination, substantially as hereinbefore set forth, of the knotter, means which move it toward the gavel as it is winding and laying the knot, means which carry it onward past and away from the gavel after the knot is laid to strip and tighten the knot, and a slotted hood arranged in such manner relatively to the knotter that the latter in its primary lateral movement approaches and reaches the rear end of the slot immediately beneath the gavel and in its further or tightening movement has its crown swept by the under surface of the hood to push the loop therefrom.

29. The combination, substantially as hereinbefore set forth, of the reciprocating binding-carriage, the shaft in the subtending arm thereof, the pinion mounted loosely on said shaft and having a single lateral ratchet-tooth or lug, the clutch-dog pivoted to said shaft and engaging with said tooth, the rack on the supporting-frame with which the pinion engages, the brake-dog pivoted to the frame and having an anti-friction roller to travel on the periphery of a collar or hub on shaft and engaging with a notch therein at the end of one revolution of the shaft, and the gear and cam wheel on the shaft and the knotting, holding, and cutting devices driven thereby.

30. The combination, substantially as hereinbefore set forth, of the reciprocating binding-carriage, the shaft in the subtending arm thereof, the pinion mounted loosely on said shaft and having a single lateral ratchet-tooth or lug, the clutch-dog pivoted to said shaft and engaging with said tooth, the rack on the supporting-frame with which the pinion engages, the brake-dog pivoted to the frame and engaging with a notch in a collar or hub fixed to the shaft at the end of one complete revolution thereof, the gear and cam wheel, the shaft, the knotting, holding, and cutting devices swinging upon the shaft and driven by said wheel, and the cam ways or tracks on the frame whereby said swinging movement is caused.

31. The combination, substantially as hereinbefore set forth, of the reciprocating binding-carriage, the binding-arm carried thereby, the shaft journaled in the subtending arm of the carriage, the pinion mounted loosely on said shaft and having a single lateral ratchet-tooth, the clutch-dog pivoted to the shaft and engaging with said tooth, the rack on the frame with which the pinion meshes, and the brake-dog locking said shaft at the end of the outward traverse, whereby the tooth may be carried a determinate distance beyond the clutch-dog in the inward traverse and the binder-arm be given time to descend and reach the holder before the shaft is actuated in the next outward traverse.

HENRY E. PRIDMORE.

Witnesses:
PAUL ARNOLD,
JOSEPH G. PARKINSON.